US005114217A

United States Patent [19]

Beiser

[11] Patent Number: 5,114,217

[45] Date of Patent: May 19, 1992

[54] DOUBLE-REFLECTION LIGHT SCANNER

[75] Inventor: Leo Beiser, Flushing, N.Y.

[73] Assignee: Leo Beiser Inc., Flushing, N.Y.

[21] Appl. No.: 535,425

[22] Filed: Jun. 8, 1990

[51] Int. Cl.[5] .............................................. G02B 26/10

[52] U.S. Cl. .................................... 359/216; 359/220

[58] Field of Search .................. 350/6.5, 6.7, 6.8, 6.9; 250/235, 236

[56] References Cited

U.S. PATENT DOCUMENTS

| | | | |
|---|---|---|---|
| 3,619,039 | 11/1971 | Beiser | 350/285 |
| 4,084,092 | 4/1978 | Runciman | 350/6.8 |
| 4,475,787 | 10/1984 | Starkweather | 350/6.4 |
| 4,606,601 | 8/1986 | Starkweather | 350/6.4 |
| 4,796,965 | 1/1989 | Ishikawa | 350/6.8 |
| 4,936,643 | 6/1990 | Beiser | 350/6.5 |

OTHER PUBLICATIONS

Beiser, "Holographic Scanning", J. Wiley & Sons, 1988, pp. 140–143.

Kramer, "Laser Beam Deflector Cost Comparison as a Function of Performance", Holotek, pp. 1, 8, 9.

Levi, "Applied Optics", J. Wiley & Sons, 1968, cover page and p. 378.

*Primary Examiner*—Loha Ben

*Attorney, Agent, or Firm*—Martin M. Novack

[57] ABSTRACT

A light scanning system is disclosed which reduces the effects of wobble without the need for complex, cumbersome, or expensive optical equipment. A light source is provided for generating an input light beam. A rotatable support is provided, and has an axis of rotation that is substantially parallel to the input light beam. A reflector subsystem is provided, and includes a plurality of reflector pairs. Each of the reflector pairs is mounted on the support at a different azimuthal location around the axis of the rotatable support. Each of the reflector pairs has first and second light-reflective plane surfaces, the planes of which intersect at an obtuse angle. The first light-reflective surface is oriented to receive the input light beam during at least a portion of each rotational cycle of the rotatable support and to reflect the beam toward the second light-reflective surface, and the second light-reflective surface is oriented to further reflect the light beam to be approximately orthogonal to the direction of the input light beam. The disclosed structure has a scan rate and duty cycle that depends on the number of reflector pairs used.

18 Claims, 4 Drawing Sheets

632
630
631
$\alpha_1$
$L_1$
R
651
$L_2$
$\alpha_2$
620
650
652

DOUBLE-REFLECTION LIGHT SCANNER

BACKGROUND OF THE INVENTION

This invention relates to light scanners, and, more particularly, to an improved light scanner and light scanning system with wobble correction and with improved scan rate and duty cycle.

There are various important uses for light scanners which scan a collimated light beam, often a laser beam, in a line pattern across a target. This is commonly achieved by using a rotating optical scanner which repetitively scans the laser beam to produce a line scan. Among the applications for such scanners are copying and facsimile equipment, laser printers, character recognition equipment, and specialized graphics equipment. The accuracy of the scan is generally an important factor in equipment performance. Unfortunately, undesired angular perturbations in the cross-scan direction, called "wobble", result in a scanned line that varies from its intended straight or repetitive path. The wobble can be due to angular differences between multiple elements (e.g. facets) which form the repetitive scans, and/or due to pseudo-random angular shaft errors, often resulting from bearing non-uniformities. Even when the optical scanner is a single-facet device in which periodic differences may be nulled on a once-per-revolution basis, the residual pseudo-random errors can cause significant misplacements of the scan lines in the image area.

There have been various prior art approaches to reducing wobble. One method is the use of anamorphic (usually cylindrical) optics for wobble reduction. This is accomplished by first compressing the height of the illuminating beam incident upon the scanner in the cross-scan direction only (usually with an input cylinder) and then, after the beam is deflected, re-expanding the beam in the cross-scan direction only (usually with an output cylinder) as it propagates through the balance of the system optics, before forming the final focused image. Cross-scan angular error is reduced by the ratio of the beam compression (or re-expansion). For further description, reference can be made to the book by L. Beiser, "Holographic Scanning", John Wiley, (1988). However, in the case of the single facet scanner whose mirror is mounted at 45° to the rotating axis while the input beam is paraxial, this correction method fails because the compressed component of illumination is intercepted at different angles as the facet rotates, distorting and skewing its output during scan.

Another technique of wobble reduction utilizes a single linear (transmission) holographic grating mounted to a shaft at 45° such that is acts as a 45° mirror. It reduces cross-scan errors when the input and output beams are related to the grating normal by the Bragg angle (in this case, 45°). In addition to the specialized technology necessary for making such gratings, the angular sensitivity of the gratings at different wavelengths, and the diffraction efficiency sensitivity to different polarization angles during rotation are limiting factors.

U.S. Pat. Nos. 4,475,787 and 4,606,601 disclose methods and apparatus for reducing wobble using double reflection. U.S. Pat. No. 4,475,787 shows a pentaprism or pentamirror mounted to the rotating shaft to act as a monogon (single facet scanner). Double-reflection nulls the cross-scan error; that is, the error of the first reflection is nulled by an equal and opposite second reflection. Limitations of this approach are the significant bulk and unbalanced mass of the penta components, requiring further counter-balancing to achieve stable rotation. Also, the components form a relatively large optical assembly which can impose packaging and cost constraints. A variation described in U.S. Pat. No. 4,606,601 operates also by double reflection; however, only as a right angle roof mirror or prism upon an input beam which is incident normal to the axis.

In my copending U.S. patent Application Ser. No. 364,455, now U.S. Pat. No. 4,936,643, assigned to the same assignee as the present application, there is disclosed a light scanner and a light scanning system which reduces the effect of wobble without the need for complex, cumbersome, or expensive equipment. In a disclosed embodiment of that light scanning system, a light source is provided for generating an input light beam. A rotatable reflector subsystem receives the input light beam, the subsystem including first and second light-reflective plane surfaces, the planes of which intersect at an obtuse angle. The first light-reflective surface is oriented to receive the input light beam and reflect it toward the second light-reflective surface, and the second light-reflective surface is oriented to further reflect the light beam to be approximately orthogonal to the direction of the input light beam. As described in my referenced copending Application, wobble of the light scanner results in the beam moving parallel to the position it had before the wobble, and a lens can be used to focus the beam to its originally desired position. Thus, wobble correction was achieved using double reflection with a structure that was simpler, less cumbersome, better balanced, and less expensive than prior structures.

It is among the objects of this invention to provide a light scanner which reduces wobble using an approach of the general type set forth in my referenced copending Application, but which provides certain advantages over said light scanner.

SUMMARY OF THE INVENTION

The present invention is directed to a light scanner for scanning an input light beam that may be, for example, a collimated light beam or a focused light beam. In accordance with an embodiment of the invention, a rotatable support is provided, and has an axis of rotation that is substantially parallel to the input light beam. A reflector subsystem is provided, and includes a plurality of reflector pairs. Each of the reflector pairs is mounted on the support at a different azimuthal location around the axis of the rotatable support. Each of the reflector pairs has first and second light-reflective plane surfaces, the planes of which intersect at an obtuse angle. The first light-reflective surface is oriented to receive the input light beam during at least a portion of each rotational cycle of the rotatable support and to reflect said beam toward the second light-reflective surface, and the second light-reflective surface is oriented to further reflect the light beam to be approximately orthogonal to the direction of the input light beam.

In the preferred embodiments of the invention, for each reflector pair, the line defined by the intersection of the light-reflective plane surface of said pair is designated as an intersection line, and the intersection lines of all reflector pairs are in substantially the same plane; i.e., a plane substantially perpendicular to the rotational axis of the rotatable support.

The invention has the advantage of multiplying the scan rate and duty cycle, as compared to that of the light scanner of my referenced copending Application, by the number of reflector pairs used. For example, if two reflector pairs are utilized, there will be two scans (one implemented by each reflector pair) per complete revolution of the rotatable support. If four reflector pairs are utilized, there will be four scans per complete revolution of the rotatable support.

Further features and advantages of the invention will become more readily apparent from the following detailed description when taken in conjunction with the accompanying drawings.

DESCRIPTION OF THE PREFERRED EMBODIMENTS

Figure 1:
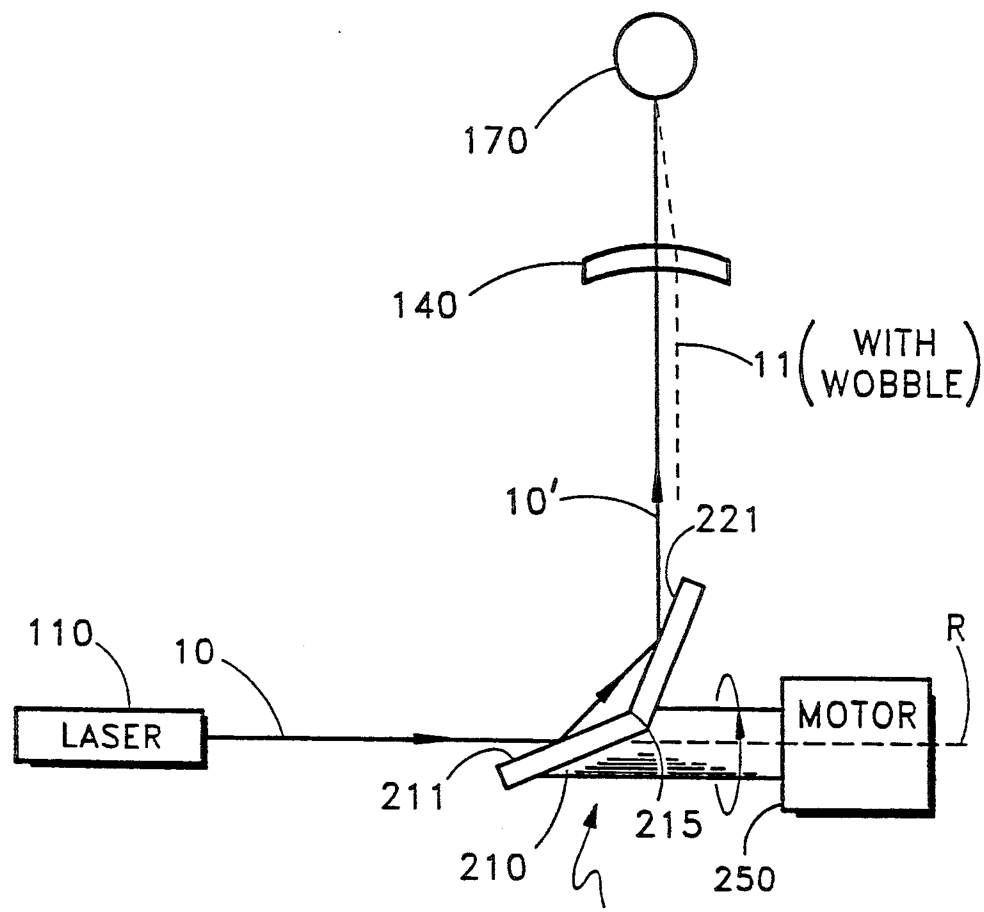
FIG. 1 is a schematic diagram, partially in block form, of a light scanning system in accordance with an embodiment set forth in my above referenced copending Application.

Referring to FIG. 1, there is shown a schematic diagram, partially in block form, of a light scanner system in accordance with an embodiment as set forth in my abovereferenced copending Application. A laser 110, which may have associated optics (not separately shown), produces a coherent light beam 10 that is input to an optical scanner subsystem 200. The beam 10 is preferably, although not necessarily, collimated and coherent. The term "light" is intended to generically include visible and near-visible light as well as other radiation having similar optical properties and which can be scanned with moveable optical elements.

Figure 2:
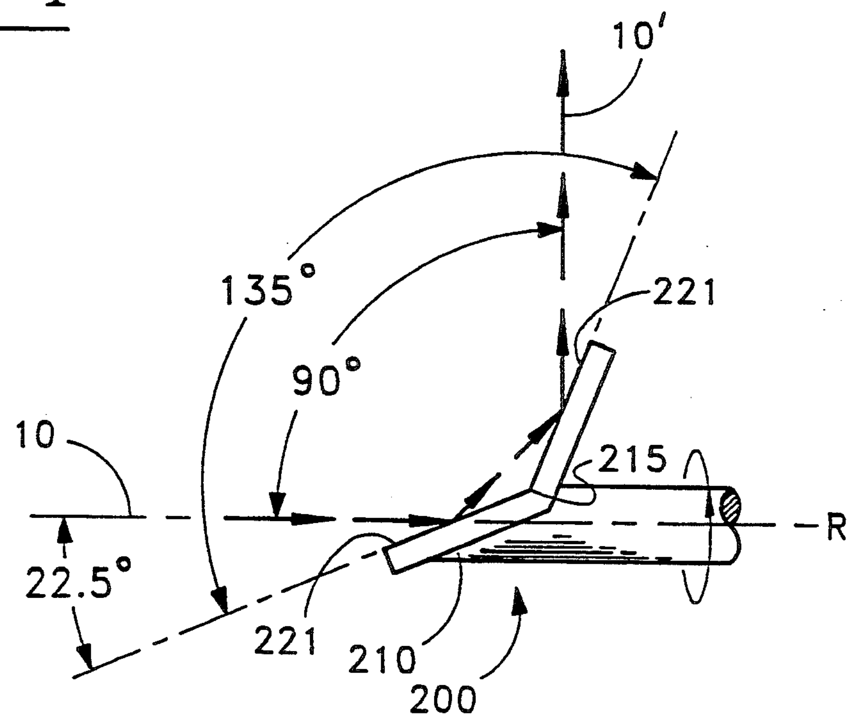
FIG. 2 shows the reflector subsystem of the FIG. 1 system, and illustrates operation thereof.
Figure 3:
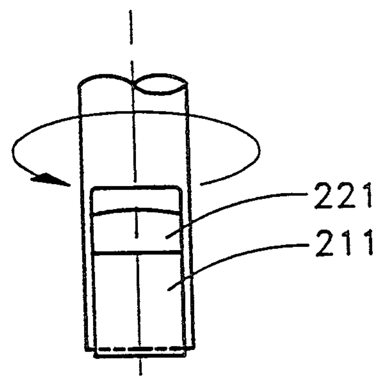
FIG. 3 is a top view of the reflector subsystem of FIG. 2.
Figure 4:
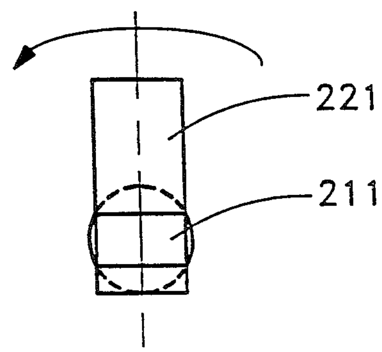
FIG. 4 is a front view of the reflector subsystem of FIG. 2.

The reflector subsystem, which is illustrated in further detail in FIGS. 2, 3 and 4, includes two plane mirrors, 211 and 221 which are mounted on a base 210 and meet at a vertex 215 to form a nominal included angle of 135°. As seen in FIG. 2, mirror 211 is oriented at an angle of 22.5° with respect to the axis of rotation (dashed line R of the reflector subsystem). A motor 250 is utilized to rotate the reflector subsystem on the axis R. The input beam is substantially in the same direction as that of the rotation axis R, and in the described embodiment of my referenced copending Application it is co-linear with the rotation axis R. As seen in FIGS. 1 and 2, for example, the input beam 10 reflects off mirror 211 toward mirror 221, and then reflects off mirror 221. The beam exiting the reflector subsystem is called the reflector subsystem output beam and is designated 10′. The reflector subsystem output beam 10′ is seen to exit at an angle of 90° from the axis R. Because of the double reflection and the 135° nominal included angle, the exiting beam is stabilized at this angle of 90° from the axis, independent of small variations in the orientation of the mirror pair with respect to the rotation axis (i.e. variation in the 22.5° angle). Thus, the 22.5° typical angle may be set at any convenient angle, and upon varying dynamically by any erroneous angle (e.g. during scanning rotation about the axis), that output beam 10′ will remain directed 90° from the input beam.

In the structure of FIG. 1, the output beam 10′ passes through focusing lens 140 and impinges on target 170. The target 170 may be, for example, a drum having its axis perpendicular to the plane of the paper. In operation of the light scanning system of FIG. 1, as the reflector subsystem is rotated, the output beam 10′ will scan lines on the target in the plane perpendicular to the plane of the paper. The beam will actually continue to scan, after leaving the target, and make a full 360° scan for each revolution of the reflector subsystem. Only a portion of each scan revolution may impinge on the target.]

Figure 5:
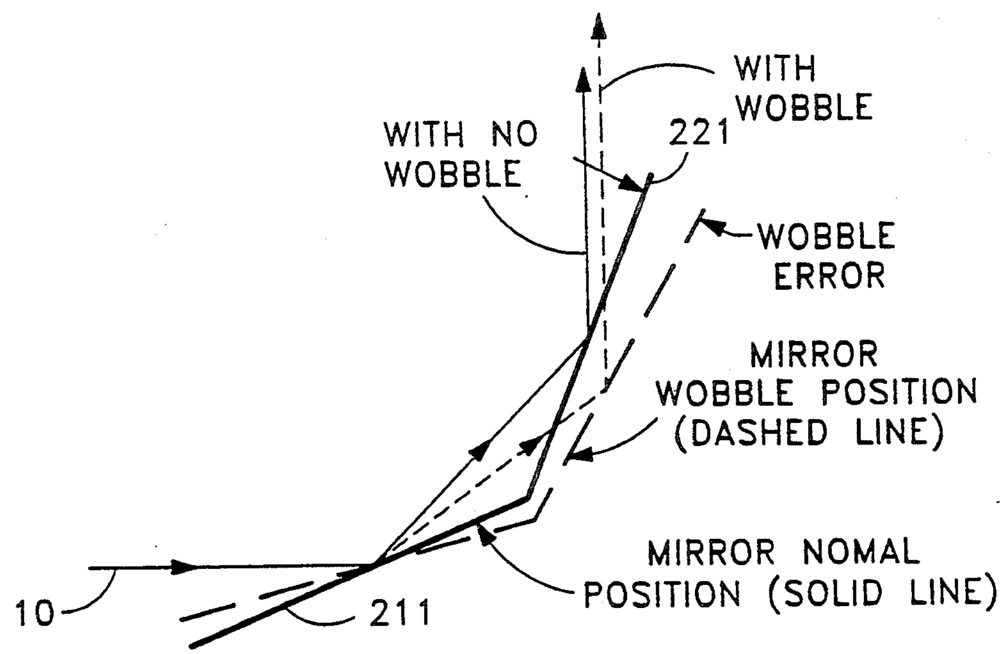
FIG. 5 is a diagram which illustrates the wobble correcting operation of the light scanning system as set forth in my referenced copending Application, and which is also applicable to the invention hereof.

FIG. 5 illustrates the wobble correction that results from the double reflection of the described structure. The solid line mirrors and solid line beam represents the no-wobble situation. The broken line version of the mirror shows the mirror position for an example of wobble error, and the dashed line beam shows the beam path for the wobble situation. As seen in the diagram, the first reflection (from mirror 211) results in twice the angular change of the mirrors due to the wobble. Upon reflection from the second mirror 221, with the wobble error) the original output direction is restored, and it is seen that the beam with wobble (dashed line) is parallel to the beam without wobble. The lens 140 can then operate to focus the beam to its originally desired position, as illustrated by the exaggerated dotted line 11 in FIG. 1. The concept of correction with double reflection was known in the art, but the system described in my referenced copending Application achieved this double reflection with a structure that was simpler, less cumbersome, better balanced, and less expensive than previous structures.

Figure 8:
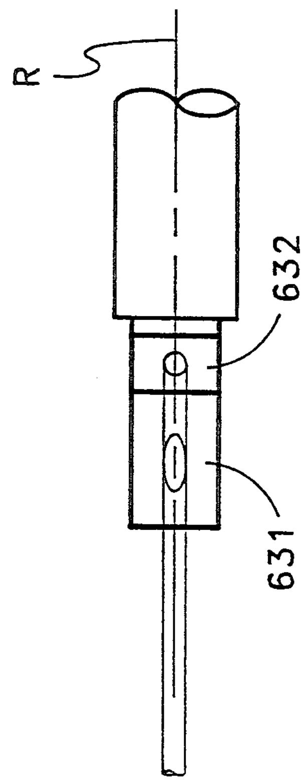
FIG. 8 is a top view of the FIG. 6 embodiment.
Figure 6:
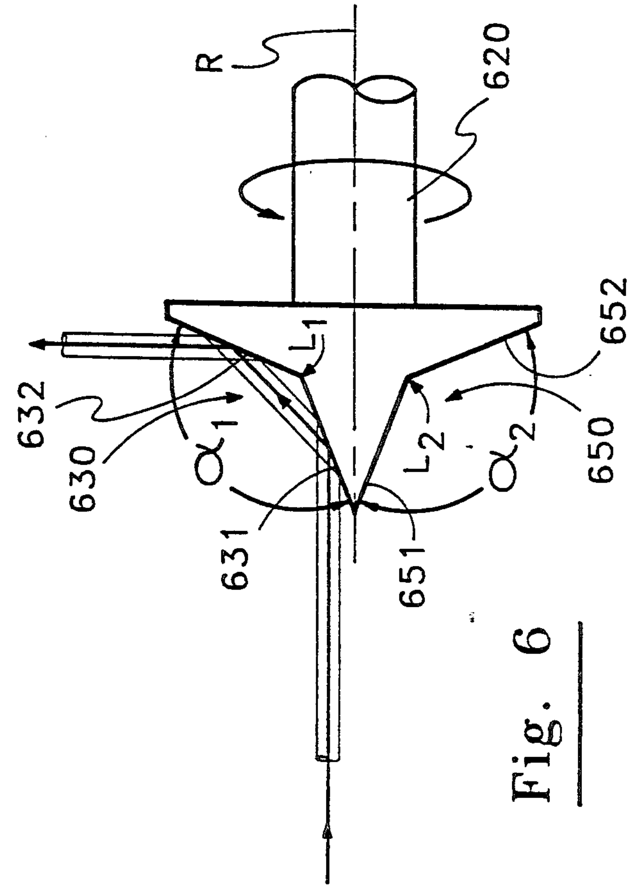
FIG. 6 is a side view of an embodiment of the invention which utilizes two reflector pairs.
Figure 7:
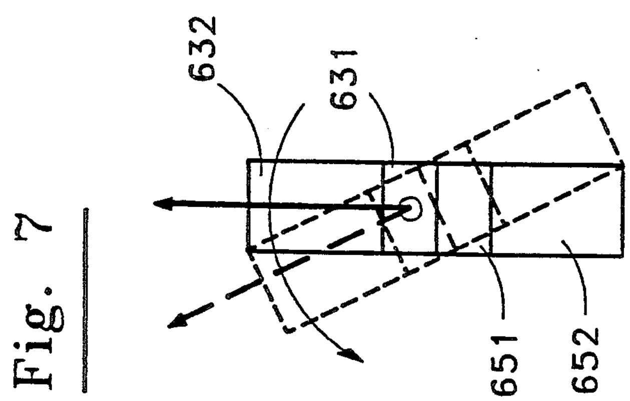
FIG. 7 is a front view of the FIG. 6 embodiment.

Referring to FIGS. 6–8, there is shown a first illustrative embodiment of the invention which utilizes two reflector pairs of the type previously described, and which are arranged at different azimuthal locations around the rotational axis R of a rotatable support or shaft 620. In this embodiment, a first reflector pair 630 and a second reflector pair 650 are at respective 180 degree angular positions around the rotational axis R. The reflector pair 630 includes two plane mirrors 631 and 632 which meet at a vertex $L_1$ to form a nominal included angle of 135°. The reflector pair 650 includes two plane mirrors 651 and 652 which meet at a vertex $L_2$ to form a nominal included angle of 135°. The reflector pairs are mounted, by any suitable means, on shaft 620, which may be driven by a motor such as 250 of FIG. 1. It is seen that the scanner of FIGS. 6–8 provides two scans per revolution of the shaft 620 rather than one, as in the structure of FIGS. 1–4. Thus, for example, when a lens 140 and target 170 are provided as in FIG. 1, two scanlines on the target will be traversed for each revolution of shaft 620.

Figure 9:
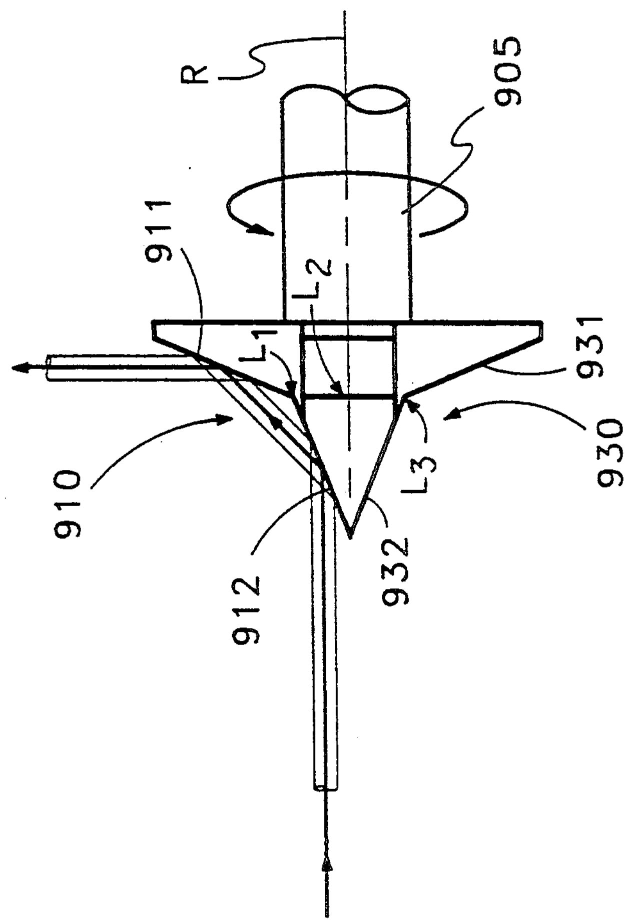
FIG. 9 is a side view of another embodiment of the invention which utilizes four reflector pairs.
Figure 10:
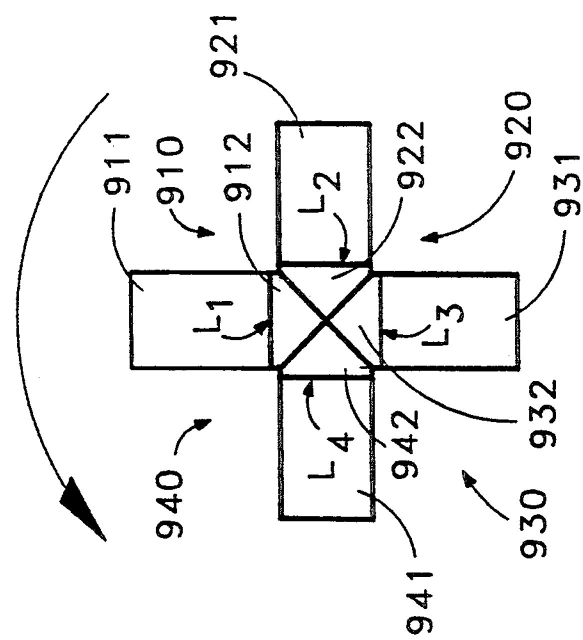
FIG. 10 is a front view of the FIG. 9 embodiment.

In the embodiment of FIGS. 9 and 10, four reflector pairs, 910, 920, 930 and 940 are illustrated as being located at 90° azimuthal spacings on the axis of rotatable support or shaft 905. The reflector pair 910 includes plane mirrors 911 and 912, the reflector pair 920 includes plane mirrors 921 and 922, the reflector pair 930 includes plane mirrors 931 and 932, and the reflector pair 940 includes plane mirrors 941 and 942. Again, the mirrors of each reflector pair meet at a vertex to form a nominal included angle of 135°. The vertices are designated $L_1$, $L_2$, $L_3$ and $L_4$. The mirrors 912, 922, 932 and 942 are seen to have triangular shapes. The scanner of FIGS. 9 and 10 is seen to provide four scans per revolution of the shaft 905. Other numbers of reflector pairs can be utilized, for example three reflector pairs or more than four reflector pairs. As the number of reflector pairs is increased, the scan rate and duty cycle will increase, but at the expense of increased diameter of the scanner assembly (to provide a sufficiently large optical aperture in the central triangular mirrors—e.g. as in FIG. 9) and the need for maintaining relative accuracy for a larger number of parameters. As in my referenced copending U.S. patent application, the rotation axis of the rotatable support member is in substantially the same direction as the input light beam (i.e., they are substantially co-linear or substantially parallel). In the description of the preferred embodiment hereof, and as seen in FIGS. 6 and 9, the central ray of the input light beam is offset from the rotation axis. In this manner, as the shaft rotates (see e.g. FIG. 7) the beam impinges on successive reflector pairs to effect the successive scans. However, if desired, the central ray could be co-linear with the rotation axis, with a portion of the beam impinging on two or more reflector pairs, which would result in a plurality of scanned beams, one or more of which can be utilized. It will be understood that in such configuration any light not used will be wasted.

The accuracy requirements for multiple scanners entail two principal factors: equality of included angles (see e.g. $\alpha_1$ and $\alpha_2$ of FIG. 6); and parallelism of intersecting lines L (in a plane substantially perpendicular to the rotational axis). As shown above (see FIG. 5), the output angle is essentially independent of the angular orientation of the assembly. Thus, when $\alpha_1=\alpha_2$ the output beams will superimpose on successive scans. The accuracy to which they overlap is determined (by mirror reflection) by twice the difference between the two angles. If, for example, $\alpha_1-\alpha_2=1$ arc sec., then the output beams will superimpose within 2 arc sec.

The criterion for angular accuracy of L (e.g. $L_1$ and $L_2$ of FIG. 6) is derived from the law of double-reflection (see, for example, L. Levi, Applied Optics, Vol. 1, John Wiley & Sons, p. 348, 1968). In FIG. 6, for example, the component of the input beam which is perpendicular to L will be rotated by $2\alpha$ with L as an axis; the component parallel to L will remain parallel to itself. Thus, if the perpendicular to line L is skewed to the input beam by a small angle x, the rotated component will be twice the cosine of the skew angle and the error will be twice the residue, or $2(\cos 0-\cos x)=2(1-\cos x)$. Since, for small angles, $\cos x=1-x^2/2$, the error component $\epsilon$ is $\epsilon=2(x^2/2)=x^2$; that is, equal to the square of the angular deviation. Conversely, the allowed deviation from parallelism of the line L to the rotating axis is $x=\sqrt{\epsilon}$.

The invention has been described with reference to particular preferred embodiments, but variations within the spirit and scope of the invention will occur to those skilled in the art. For example, it will be understood that further optical elements can be employed that are either attached to or separate from the rotating reflective subsystem. In this regard, a lens could be mounted in conjunction with the reflective subsystem to focus the exiting beam in desired fashion. Further, if it is desired to have the scan at an angle other than 90° with respect to the input beam, the angle between the reflective surfaces can be varied from the nominal 135° angle.

I claim:

1. A light scanner for scanning an input light beam, comprising:

a rotatable support having an axis of rotation that is substantially parallel to said input light beam;

a reflector subsystem including a plurality of reflector pairs, each of said reflector pairs being mounted on said support at a different azimuthal location around the axis of said rotatable support;

the central ray of said input light beam being offset from the rotational axis of said rotatable support;

each of said reflector pairs having first and second light-reflective plane surfaces, the planes of which intersect at an obtuse angle, said first light-reflective surface being oriented to receive said input light beam during at least a portion of each rotational cycle of the rotatable support and to reflect said beam toward said second light-reflective surface, and said second light-reflective surface being oriented to further reflect said beam to be approximately orthogonal to the direction of said input light beam.

2. The light scanner as defined by claim 1, further comprising means for rotating said rotatable support on its axis.

3. The light scanner as defined by claim 2, wherein the planes of said first and second light-reflective surfaces of each reflector pair intersect to include an angle of about 135°.

4. The light scanner as defined by claim 1, wherein the planes of said first and second light-reflective surfaces of each reflector pair intersect to include an angle of about 135°.

5. The light scanner as defined by claim 4, wherein, for each reflector pair, the line defined by the intersection of the light-reflective plane surfaces of said pair is designated as an intersection line, and wherein the intersection lines of all the reflector pairs are in substantially the same plane.

6. The light scanner as defined by claim 1, wherein said plurality of reflector pairs comprises two reflector pairs.

7. The light scanner as defined by claim 1, wherein said plurality of reflector pairs comprises four reflector pairs.

8. The light scanner as defined by claim 1, wherein, for each reflector pair, the line defined by the intersection of the light-reflective plane surfaces of said pair is designated as an intersection line, and wherein the intersection lines of all the reflector pairs are in substantially the same plane.

9. The light scanner as defined by claim 8, wherein said same plane is substantially perpendicular to the rotational axis of said rotatable support.

10. A light scanning system, comprising:

a light source for generating an input light beam;

a rotatable support having an axis of rotation that is substantially parallel to said input light beam;

a reflector subsystem including a plurality of reflector pairs, each of said reflector pairs being mounted on said support at a different azimuthal location around the axis of said rotatable support;

the central ray of said input light beam being offset from the rotational axis of said rotatable support;

each of said reflector pairs having first and second light-reflective plane surfaces, the planes of which intersect at an obtuse angle, said first light-reflective surface being oriented to receive said input light beam during at least a portion of each rotational cycle of the rotatable support and to reflect said beam toward said second light-reflective surface, and said second light-reflective surface being oriented to further reflect said beam to be approximately orthogonal to the direction of said input light beam; and means for rotating said rotatable support on its axis.

11. The light scanning system as defined by claim 10, wherein the planes of said first and second light-reflective surfaces of each reflector pair intersect to include an angle of about 135°.

12. The light scanning system as defined by claim 11, wherein, for each reflector pair, the line defined by the intersection of the light-reflective plane surfaces of said pair is designated as an intersection line, and wherein the intersection lines of all the reflector pairs are in substantially the same plane.

13. The light scanning system as defined by claim 10, wherein the axis of said input light beam is offset from the rotational axis of said rotatable support.

14. The light scanning system as defined by claim 13, wherein, for each reflector pair, the line defined by the intersection of the light-reflective plane surfaces of said pair is designated as an intersection line, and wherein the intersection lines of all the reflector pairs are in substantially the same plane.

15. The light scanning system as defined by claim 10, wherein said plurality of reflector pairs comprises two reflector pairs.

16. The light scanning system as defined by claim 10, wherein said plurality of reflector pairs comprises four reflector pairs.

17. The light scanning system as defined by claim 10, wherein, for each reflector pair, the line defined by the intersection of the light-reflective plane surfaces of said pair is designated as an intersection line, and wherein the intersection lines of all the reflector pairs are in substantially the same plane.

18. The light scanning system as defined by claim 17, wherein said same plane is substantially perpendicular to the rotational axis of said rotatable support.

* * * * *